United States Patent
Spelta et al.

(10) Patent No.: US 9,102,317 B2
(45) Date of Patent: Aug. 11, 2015

(54) ELECTRICALLY PEDAL-ASSISTED BICYCLE

(75) Inventors: Cristiano Spelta, Bellusco (IT); Giovanni Alli, Legnano (IT); Pierfrancesco Spagnol, Milan (IT); Sergio Matteo Savaresi, Cremona (IT); Massimo Vanzulli, Gerenzano (IT); Giuseppe Biesuz, Milan (IT)

(73) Assignees: POLITECNICO DI MILANO, Milan (IT); SEMS S.r.l., Milan (IT); FNM S.p.A., Milan (IT)

( * ) Notice: Subject to any disclaimer, the term of this patent is extended or adjusted under 35 U.S.C. 154(b) by 58 days.

(21) Appl. No.: 13/981,627

(22) PCT Filed: Feb. 2, 2012
(Under 37 CFR 1.47)

(86) PCT No.: PCT/IB2012/050492
§ 371 (c)(1),
(2), (4) Date: Oct. 2, 2013

(87) PCT Pub. No.: WO2012/104810
PCT Pub. Date: Aug. 9, 2012

(65) Prior Publication Data
US 2014/0062351 A1    Mar. 6, 2014

(30) Foreign Application Priority Data
Feb. 3, 2011 (IT) .............. MI2011A0150

(51) Int. Cl.
*H02K 7/00* (2006.01)
*B62M 6/45* (2010.01)
*B60W 10/26* (2006.01)
*B60L 11/18* (2006.01)
*B60L 15/20* (2006.01)
*B62M 6/50* (2010.01)
*B60L 11/00* (2006.01)

(52) U.S. Cl.
CPC .............. *B60W 10/26* (2013.01); *B60L 11/007* (2013.01); *B60L 11/1801* (2013.01);
(Continued)

(58) Field of Classification Search
CPC ............................. Y02T 10/7005; B62M 6/45
See application file for complete search history.

(56) References Cited

U.S. PATENT DOCUMENTS 5,749,429 A * 5/1998 Yamauchi et al. ......... 180/206.4
5,777,442 A * 7/1998 Miyata .............................. 318/2
(Continued)

FOREIGN PATENT DOCUMENTS

DE    19600243 A1    7/1997
EP    1886913 A2 *   2/2008
(Continued)

OTHER PUBLICATIONS

PCT Search Report in PCT/IB2012/050492 dated Mar. 19, 2012.

*Primary Examiner* — Eduardo Colon Santana
*Assistant Examiner* — Cortez Cook
(74) *Attorney, Agent, or Firm* — Manelli Selter PLLC; Edward J. Stemberger

(57) ABSTRACT

It is described an electronic system (50) to drive an electric device (5) of a bicycle assisted electrically (1) by means of a rechargeable battery (6). In case of detecting that the calculated human power is greater than or equal to the bicycle estimated friction power and in case of detecting that the state of charge of the battery (6) is greater than or equal to a first threshold, the processor is such to generate a driving current value for driving the electric device (5) operating as an electric motor (5) supplied from the battery (6). In case of detecting that the calculated human power is smaller than the estimated bicycle friction power, the processor is such to convert at least part of the human power into electric power by means of the electric device (5) operating as an electric generator (5), and generate therefrom another driving current value for charging the battery (6) from the electric device operating as electric generator.

10 Claims, 9 Drawing Sheets

(52) U.S. Cl.
CPC ........ *B60L 11/1877* (2013.01); *B60L 15/2009* (2013.01); *B60L 15/2045* (2013.01); *B60L 15/2054* (2013.01); *B62M 6/50* (2013.01); *B60L 2200/12* (2013.01); *Y02T 10/7005* (2013.01); *Y02T 10/705* (2013.01); *Y02T 10/7283* (2013.01)

(56) References Cited

U.S. PATENT DOCUMENTS

| | | | |
|---|---|---|---|
| 5,910,714 A | * | 6/1999 | Buchanan et al. ............ 318/139 |
| 5,992,553 A | * | 11/1999 | Morrison .................... 180/206.2 |
| 2003/0047369 A1 | * | 3/2003 | Katagiri et al. ............... 180/206 |
| 2004/0263099 A1 | * | 12/2004 | Maslov et al. ................ 318/254 |
| 2009/0011907 A1 | * | 1/2009 | Radow et al. .................... 482/57 |
| 2009/0273872 A1 | * | 11/2009 | Cordes et al. ................ 361/93.1 |
| 2011/0160945 A1 | * | 6/2011 | Gale .............................. 701/22 |

FOREIGN PATENT DOCUMENTS

| | | |
|---|---|---|
| JP | H08150982 A | 6/1996 |
| JP | 2002255080 A | 9/2002 |
| JP | 2002255081 A | 9/2002 |

\* cited by examiner

ELECTRICALLY PEDAL-ASSISTED BICYCLE

TECHNICAL FIELD OF THE INVENTION

The present invention generally refers to the field of the electrical bicycles. More in particular, the present invention concerns an electrically pedal-assisted bicycle by means of rechargeable batteries.

PRIOR ART

Electrically pedal-assisted bicycles by means of batteries are known: see, for example, the European patents EP 1612084, EP 1886913. Such bicycles have the disadvantage to have a limited range, because in case of an extended use of the bicycle the used battery discharges and thus it is necessary to recharge the battery by means of the electric network.

European patent nb. 1236640-B1 claims the priority of Japanese patent application having publication nb. 2002/255080, publication date of Sep. 11, 2002, filing nb. 2001/055400 and filing date of Feb. 28, 2001 and claims the priority of Japanese patent application having publication nb. 2002/2550801, publication date of Sep. 11, 2002, filing nb. 2001/055401 and filing date of Feb. 28, 2001; accordingly, EP 1236640-B1 includes the subject-matter of the two above indicated Japanese patent applications.

EP 1236640-B1 discloses a control unit for a motor-assisted bicycle during a period of initial pedaling or startup on an upward slope or at the time of acceleration. EP 1236640-B1 does not disclose to monitor the state of charge of the battery 17.

German patent application nb. DE 19600243-A1 published on Jul. 10, 1997 discloses a control circuit for metering the power to electrical loads on a bicycle which has an auxiliary drive. DE 19600243-A1 discloses to monitor the state of charge of the battery 12 (see the signal generator in FIG. 1) when charging the battery 12 (see FIG. 4, wherein the state of charge of the battery 12 is indicated as percentage of the maximum power) and when the electric motor 11 is generating electrical power (see FIG. 5, wherein again the state of charge of the battery 12 is indicated as percentage of the maximum power). DE 19600243-A1 further discloses that the battery 12 is charged during braking or when the bicycle 1 is travelling downhill (see the flow chart in FIG. 2).

BRIEF SUMMARY OF THE INVENTION

The present invention refers to an electronic system to drive an electric device of an electrically assisted bicycle as defined in the enclosed claim 1 and to its preferred embodiments described in dependent claims from 2 to 5.

The Applicant has perceived that the electronic system according to the present invention allows to obtain a running condition for the cyclist which is particularly comfortable (that is, the cyclist exerts less effort during the run) and in a completely automatic way (that is it does not require any manual control by the cyclist and thus it is not necessary any button to turn on/off the electric motor), increasing the bicycle range (possibly without requiring to charge the battery by means of the electric network) because it allows to maintain a sufficient state of charge of the battery also during an extended use of the bicycle.

It is an object of the present invention also an electrically pedal-assisted bicycle as defined in the enclosed claim 6.

It is an object of the present invention also a method for driving an electric device of an electrically pedal-assisted bicycle as defined in the enclosed claim 7 and its preferred embodiments described in the dependent claims 8 and 9.

It is an object of the present invention also a program for computer as defined in the enclosed claim 10.

BRIEF DESCRIPTION OF THE DRAWINGS

Further characteristics and advantages of the invention will result from the following description of a preferred embodiment and of its variants provided only as an example with reference to the enclosed drawings, wherein.

DETAILED DESCRIPTION OF THE INVENTION

Figure 1:
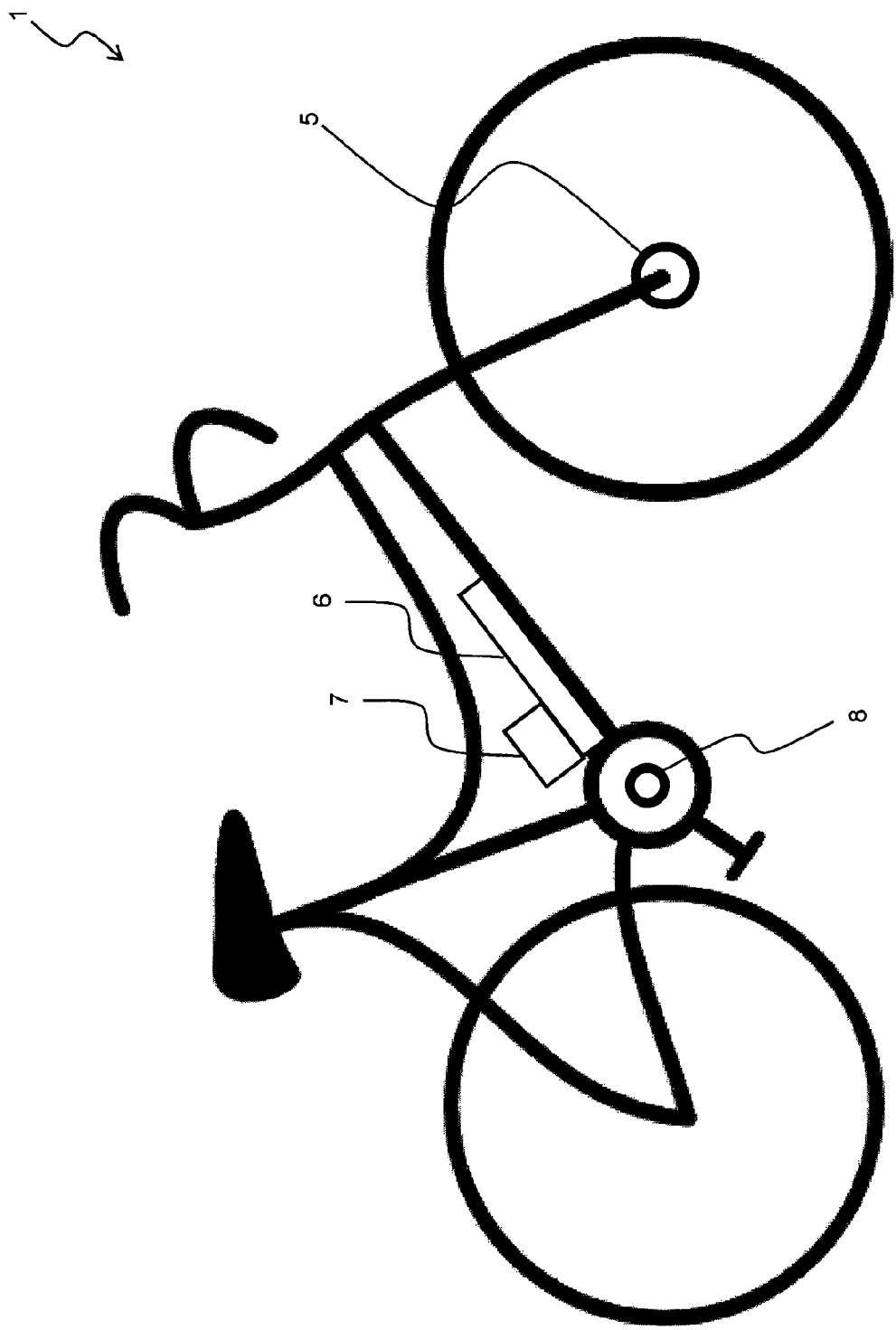
FIG. 1 schematically shows an electrically pedal-assisted bicycle according to an embodiment of the invention.

Referring to FIG. 1, it is schematically shown an electrically assisted bicycle according to an embodiment of the invention.

Bicycle 1 comprises a battery 6, a control module 7, a measurement module 8 for measuring the angular velocity of the pedal arms and for measuring the torque of the pedal arms, a motor housing 5. Preferably, the bicycle 1 comprises an inclination sensor (not shown in FIG. 1) for measuring the inclination of the road along wherein the bicycle is running; for example, the inclination sensor is positioned in the pedal arms assembly.

The battery 6 and the control module 7 are for example positioned on the bicycle frame in the part joining the front portion to the portion supporting the pedal arms assembly.

The measurement module 8 is positioned in the pedal arm assembly as schematically shown in FIG. 1.

The motor housing 5 is for example mounted in the front wheel, as shown in FIG. 1; alternatively, the motor housing 5 is mounted in the rear wheel. The motor housing 5 comprises:

an electric device mechanically connected to the front wheel, a motor sensor for measuring the angular velocity $\omega_{mot}$ of the electric motor (for example, the revolution per minute).

For example, in case wherein the motor housing 5 is mounted in the rear wheel, the electric device is connected to the hub of the front wheel. Alternatively, the electric device is mounted on other kinds of supports and the bicycle comprises transmission members for transferring the mechanical power from the electric motor to the (front or rear) wheel.

The term electric device mounted in the motor housing 5 means, in the present description, an electric device which is such to have a first and a second operation mode. In the first operation mode the electric device is such to operate as an electric motor supplied by the battery 6, that is it is such to convert the electric power supplied by the battery 6 into mechanical power used for rotating the electric motor and thus for contributing to the movement of the bicycle 1; in the second operation mode the electric device is such to operate as an electric generator for charging the battery 6.

The motor sensor comprises, for example, integrated Hall sensors which supply information about the relative position of the electric motor, wherefrom it is obtained the velocity of the electric motor by deriving the relative position of the electric motor.

The control module 7 has the function to control the electric device and the battery 6, so that the electric device is operating in the first mode as an electric motor or in the second mode as an electric generator.

Figure 2:
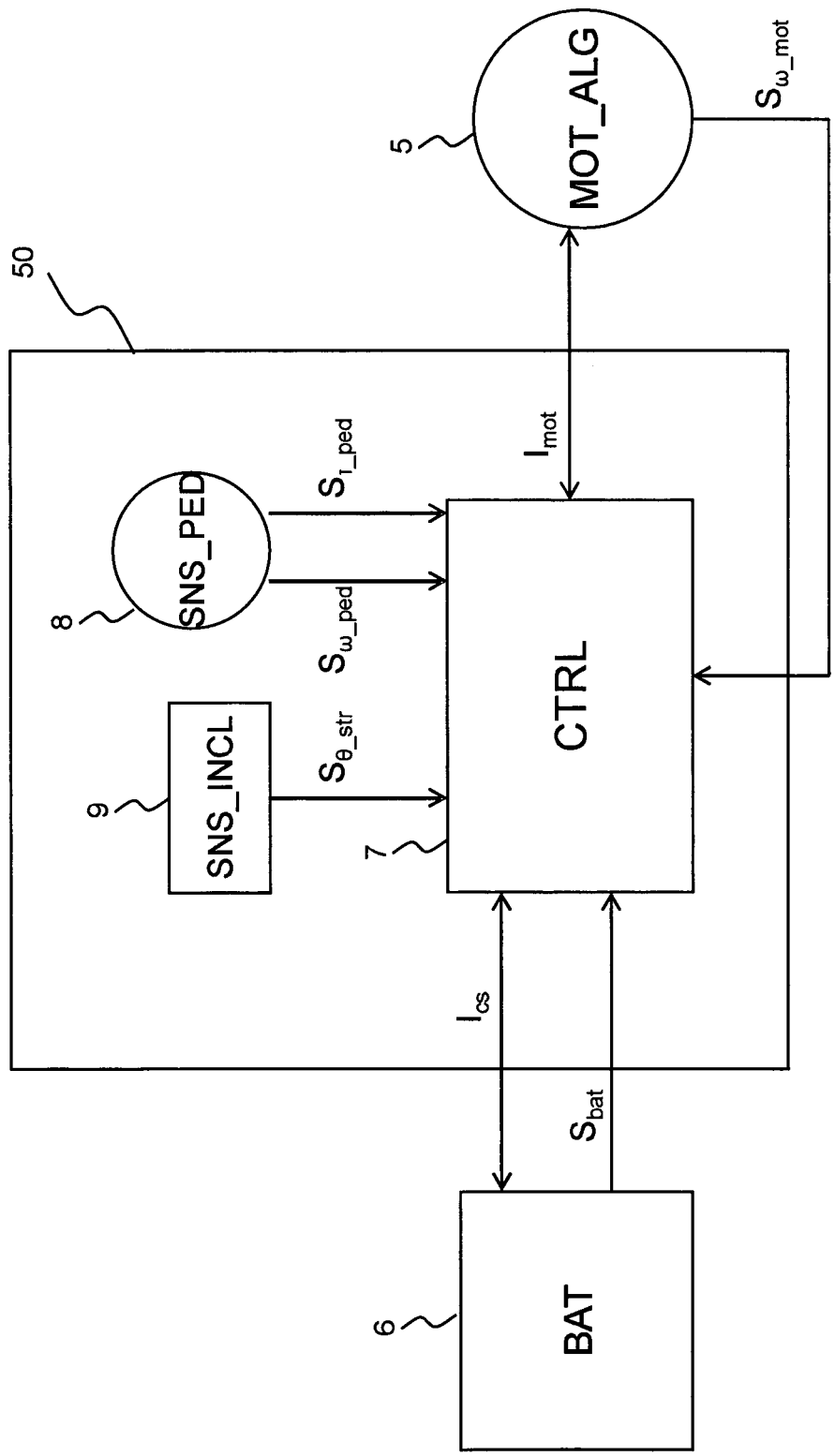
FIG. 2 schematically shows an electronic system to drive an electric device of an electrically pedal-assisted bicycle according to an embodiment of the invention.

Referring to FIG. 2, it is shown an electronic system 50 to drive an electric device of the bicycle 1.

The electronic system 50 comprises:
- a measurement module 8 having the function to measure the angular velocity $\omega_{mot}$ of the pedal arms of the bicycle 1 and the torque $T_{ped}$ generated by the cyclist on the pedal arms of the bicycle 1,
- the motor sensor to measure the angular velocity $\omega_{mot}$ of the electric motor (the motor sensor for the sake of simplicity has not been shown in FIG. 2 and it is included in the motor housing 5),
- the control module 7.

In particular, the measurement module 8 is such to measure the angular velocity $\omega_{mot}$ of the pedal arms of the bicycle 1 and it is such to generate a pedal arms velocity signal $S_{\omega\_ped}$ indicating the performed measure of the angular velocity $\omega_{ped}$ of the pedal arms of the bicycle 1; moreover, the measurement module 8 is such to measure the torque $T_{ped}$ generated by the cyclist on the pedal arms of the bicycle 1 and it is such to generate a pedal arms torque signal $S_{T\_ped}$ indicating the performed measure of the torque $T_{ped}$ generated by the cyclist on the pedal arms of the bicycle 1.

Advantageously, the measurement module 8 is implemented with a single component such to generate both the pedal arms velocity signal $S_{\omega\_ped}$ and the pedal arms torque signal $S_{T\_ped}$; for example, it is possible to use the "Sensory BB-Cartridges X-CELL RT" manufactured by Alfred Thun GmbH (www.thun.de), having the technical characteristics described in the document downloadable from the following link: www.thun.de/thun_eng/Datenblatt%20X-CELL_GE.pdf The motor sensor is such to measure the angular velocity $\omega_{mot}$ of the electric motor and it is such to generate a motor velocity signal $S_{\omega\_mot}$ indicating the performed measurement of the angular velocity $\omega_{mot}$ of the electric motor.

When the electric device is such to operate as an electric motor, the control module 7 is such to receive at the input the pedal arms velocity signal $S_{\omega\_ped}$ and the pedal arms torque signal $S_{T\_ped}$, it is such to receive at the input the motor velocity signal $S_{\omega\_mot}$, it is such to receive at the input from the battery 6 a battery signal $S_{bat}$ indicating one or more electric values associated to the battery 6, it is such to receive at the input from battery 6 a charge/discharge current signal $I_{cs}$ which carries a current generated by the battery 6 and it is such to generate a motor current signal $I_{mot}$ which carries said charge/discharge current $I_{cs}$ in order to supply the electric device operating as an electric motor, as it will be explained more in detail afterwards in the part regarding the operation.

Moreover, when the electric device is such to operate as an electric generator, the control module 7 is such to receive at the input the pedal arms velocity measurement signal $S_{\omega\_ped}$ and the pedal arms torque measurement signal $S_{T\_ped}$, it is such to receive at the input the motor velocity measurement signal $S_{\omega\_mot}$, it is such to receive at the input from the battery 6 the battery signal $S_{bat}$, it is such to receive at the input from the motor housing 5 the motor current signal $I_{mot}$ carrying a current generated by the electric generator and it is such to generate the charge/discharge current signal $I_{cs}$ carrying said motor current $I_{mot}$ in order to recharge the battery 6, as it will be explained more in detail afterwards in the part regarding the operation.

Preferably, the electronic system 50 further comprises an inclination sensor 9 for measuring the slope $\theta_{str}$ of the road wherein the bicycle is running. The inclination sensor 9 is such to measure the slope $\theta_{str}$ of the road wherein the bicycle is running and it is such to generate a slope signal $S_{\theta\_str}$ indicating the performed measure of the slope $\theta_{str}$ of the road wherein the bicycle is running. In this case, when the electric device is such to operate as an electric motor, the control module 7 is such to generate the motor current signal $I_{mot}$ for supplying the electric motor by further taking into account the value of the slope signal $S_{\theta\_str}$, as it will be explained more in detail afterwards in the part regarding the operation.

Figure 3:
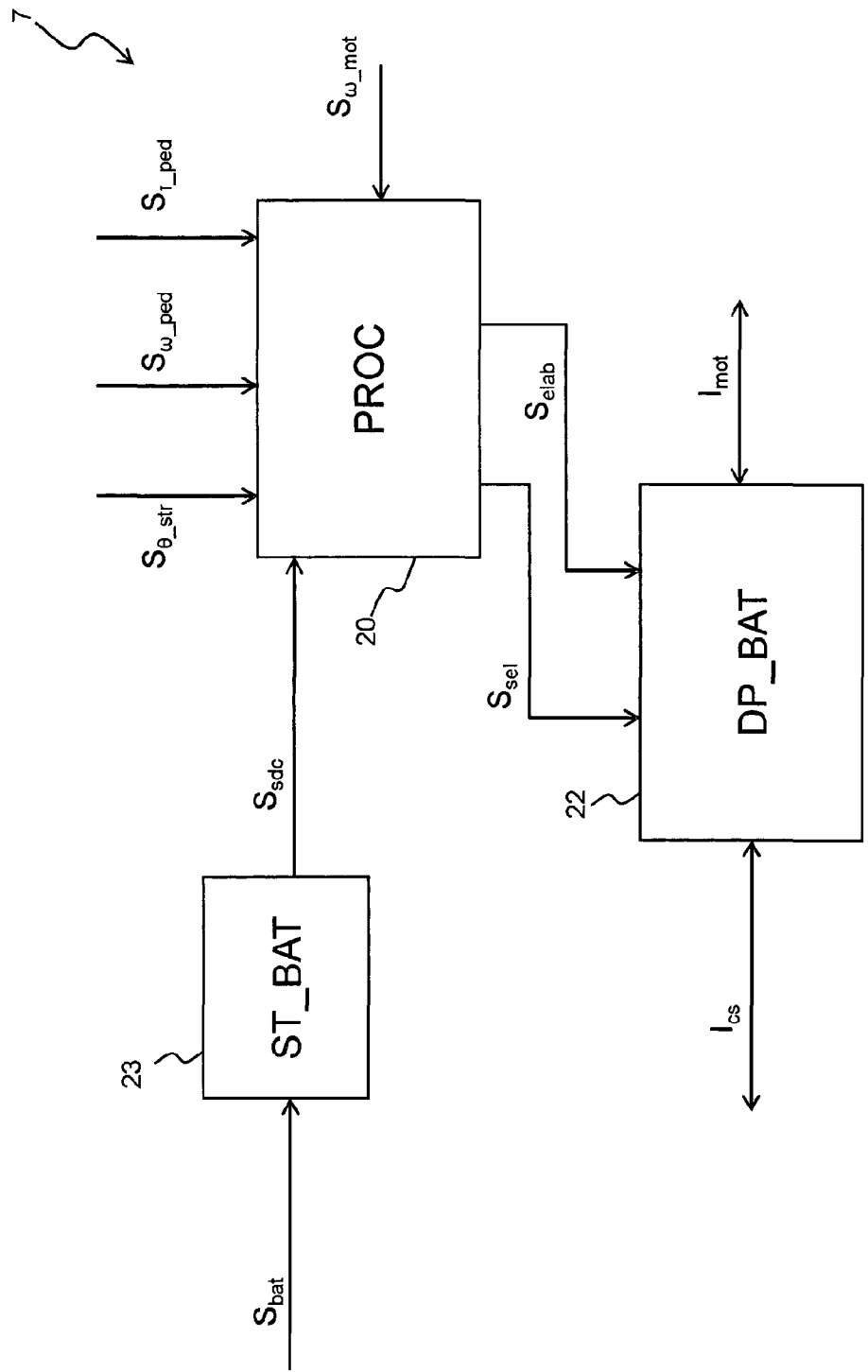
FIG. 3 shows more in detail a control module used in the electronic driving system according to the embodiment of the invention, FIG. 4a schematically shows a flow chart of a method for driving the electric device of the electrically pedal-assisted bicycle according to a first embodiment of the invention.

Referring to FIG. 3, it is shown more in detail the control module 7. The control module 7 comprises:
- a processor 20;
- a current management module 22;
- a state of charge detecting circuit 23 for detecting the state of charge of the battery 6.

Figure 4A:
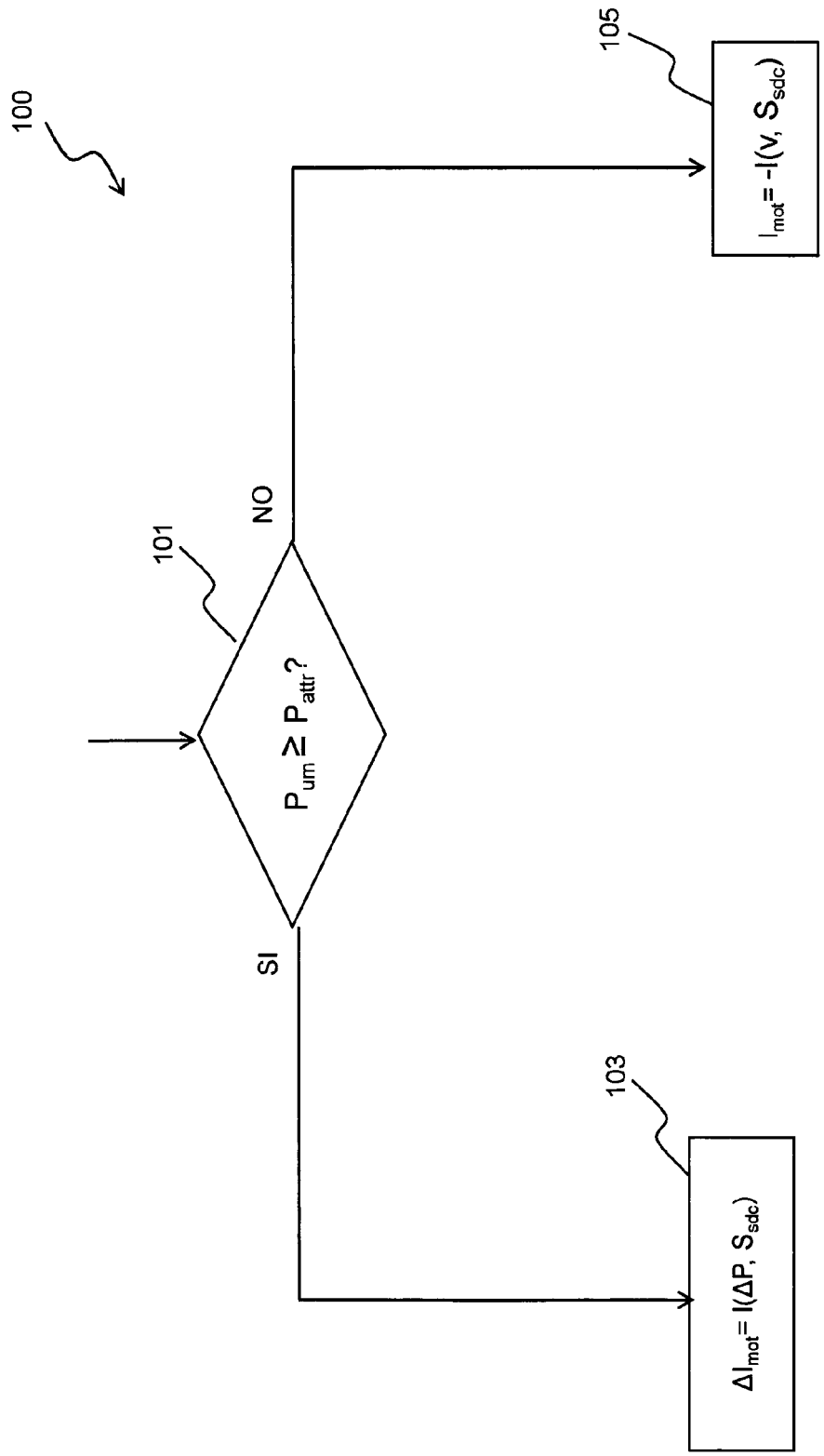
FIG. 4b schematically shows a flow chart of a method for driving the electric device of the electrically pedal-assisted bicycle according to a second embodiment of the invention.
Figure 4B:
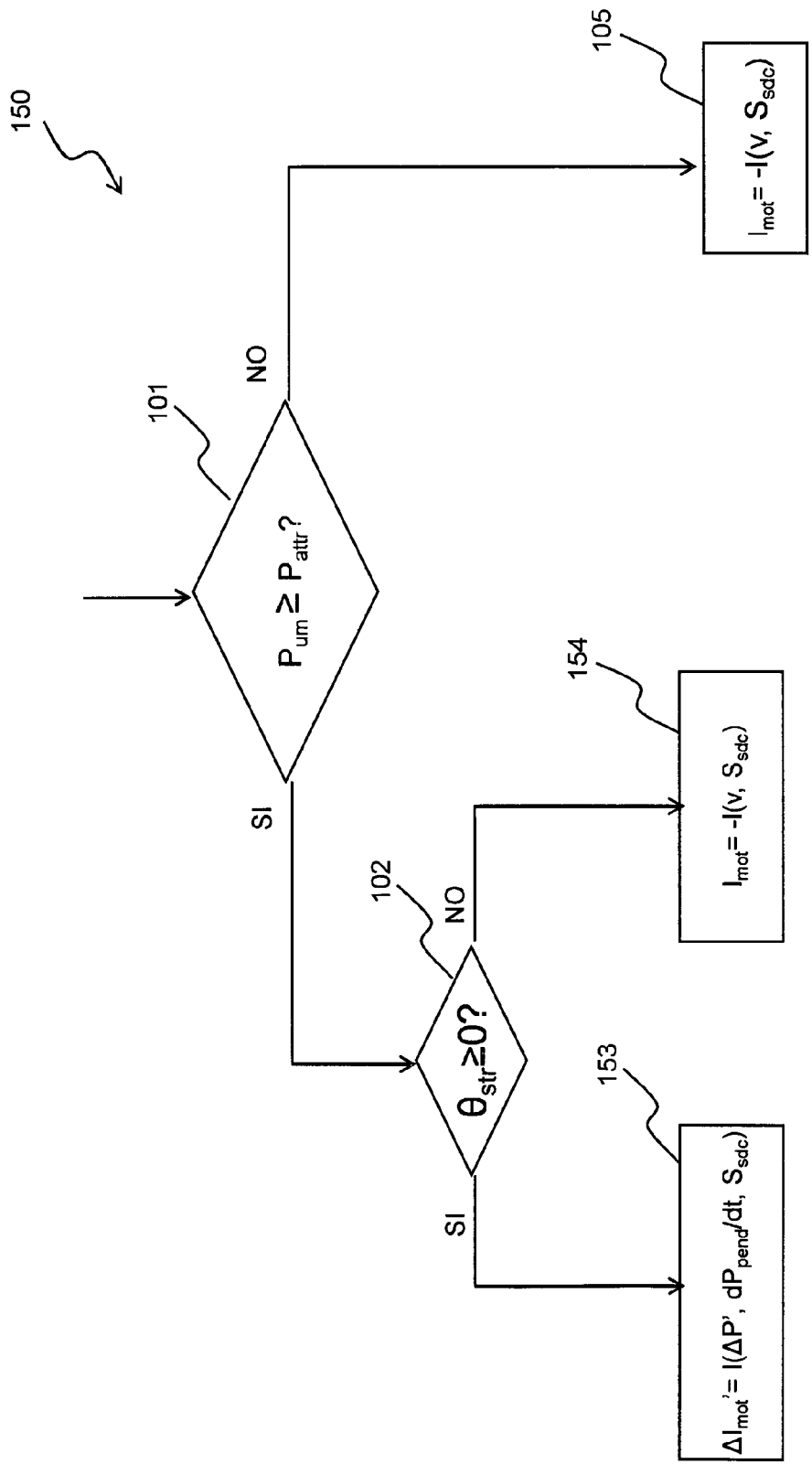

The processor 20 is such to perform the method 100 shown in FIG. 4a and the method 150 shown in FIG. 4b for driving the electric device in the motor housing 5 of the bicycle 1, wherein the method is performed by means of an algorithm implemented with software code portions. For example, the processor 20 is a microcontroller and the software code is implemented with "ANSI C" code.

The state of charge detecting circuit 23 is such to receive the battery signal $S_{bat}$ and, as a function of it, is such to calculate a state of charge signal $S_{sdc}$ indicating the state of charge of the battery 6. For example, the battery 6 is composed of two or more cells, the battery signal $S_{bat}$ is the value of the voltages of the cells and the state of charge signal $S_{sdc}$ is a value expressed as a percentage indicating the state of charge of the battery 6 (for example: 100%=the battery 6 is completely charged, 50%=the battery 6 is half charged).

The processor 20 is such to receive at the input the pedal arms velocity signal $S_{\omega\_ped}$, the pedal arms torque signal $S_{T\_ped}$, the motor velocity signal $S_{\omega\_mot}$, the state of charge signal $S_{sdc}$ and, as a function of the values of signals received at the input, is such to generate a selection signal $S_{sel}$ having a first logic value (for example, a low logic value) for indicating the first operation mode as an electric motor and having a second logic value (for example, a high logic value) for indicating the second operation mode as an electric generator. Moreover, the processor 20 is such to generate a processed signal $S_{elab}$ carrying the value of the charge/discharge current signal $I_{cs}$ for charging the battery 6 or the value of the motor current signal $I_{mot}$ for driving the electric motor.

The current management module 22 has the function to control the current direction between the battery 6 and the electric device. In particular, the current management module 22 is such to receive from the processor 20 the processed signal $S_{elab}$ and the selection signal $S_{sel}$. When the selection signal $S_{sel}$ has the first logic value indicating the first operation mode as electric motor, the current management module 22 is such to receive from battery 6 the charge/discharge current $I_{cs}$ signal and it is such to transmit the motor current signal $I_{mot}$ equal to the charge/discharge current signal $I_{cs}$ and having a value depending on the value of processed signal $S_{elab}$. When the selection signal $S_{sel}$ has the second logic value indicating the second operation mode as electrical generator, the current management module 22 is such to receive from the electric generator the motor current $I_{mot}$ signal and it is such to transmit the charge/discharge current $I_{cs}$ signal equal to the motor current $I_{mot}$ signal and having a value depending on the value of the processed signal $S_{elab}$.

It has to be observed that, for the purpose of the explanation of the invention, two signals ($S_{sel}$, $S_{elab}$) carrying the information from the processor 20 to the current management module 22 have been considered, however this should be intended just as a functional description which is not limiting, which can also be implemented differently. For example, it is possible to use a bus connecting the processor 20 to the current management module 22: in this case, the processor 20 exchanges information with the current management module 22 by means of a communications protocol on the bus, for example a bus of the CAN type (Controller Area Network).

Referring to FIG. 4a, it is shown schematically a flow chart of the method 100 for driving the electric device of the electrically assisted bicycle 1 according to a first embodiment of the invention.

The method 100 comprises the steps 101, 103, 105.

In step 101 it is performed the comparison between the human power $P_{um}$ with respect to the friction power $P_{attr}$: in case the human power is greater than or equal to the friction power, it is performed the step 103, otherwise it is performed the step 105.

The term human power $P_{um}$ means the power generated by the cyclist on the pedal arms of the bicycle 1 when the cyclist is pedaling; in other words, it is the effort performed by the cyclist when he is pressing on the pedal arms with his feet. For example, the human power $P_{um}$ is calculated with the following formula (1):

$$P_{um}=T_{ped}*\omega_{ped} \quad (1)$$

Wherein $T_{ped}$ is the torque generated by the cyclist on the pedal arms of the bicycle 1 and $\omega_{ped}$ is the angular velocity of the pedal arms of the bicycle 1.

The term friction power $P_{attr}$ means the estimation of the power wasted for frictions caused by the cyclist and by the bicycle when the cyclist is pedaling, such as for example the friction between the cyclist and the air, the friction between the bicycle 1 and the air, the friction between the wheels of the bicycle 1 and ground, the frictions of bicycle gears for transmitting the motion from the pedals to the rear wheel. For example, the friction power $P_{attr}$ is calculated with the following formula (2)

$$P_{attr}=R_{rt}*F_{attr}(v)*\omega_{rt} \quad (2)$$

wherein $R_{rt}$ is the radius of the front wheel of the bicycle 1, $\omega_{rt}$ is the angular velocity of the front wheel of the bicycle 1, v is the velocity of the bicycle 1 (for example, calculated with the formula $v=\omega_{rt}*R_{rt}$), $F_{attr}(v)$ (known as "coasting down" function) indicates the value of the friction of the bicycle as a function of velocity v of bicycle 1 and it is obtained experimentally for example by means of a downhill test of the bicycle without pedaling until it stops. For example, the function $F_{attr}(v)$ has a parabolic shape of the type $F_{attr}(v)=F_0+a*v^2$, wherein $F_0$ and a are pre-determined values.

It has to be observed that, for the purpose of explaining the invention, it is assumed for simplicity $\omega_{mot}=\omega_{rt}$, that is it is assumed that the angular velocity $\omega_{rt}$ of the front wheel of the bicycle 1 is equal to the angular velocity $\omega_{mot}$ of the electric motor mounted in the motor housing 5 of the front wheel (for example, there are no gears reducing the ratio between the angular velocity of the electric motor and the angular velocity of the front wheel).

Moreover, it has to be observed that in the embodiment shown in the figures it is assumed that the motor housing 5 is mounted in the front wheel, however similar considerations can be made in case the motor housing 5 is mounted in the rear wheel: in this case $\omega_{rt}$ is the angular velocity of the rear wheel and $\omega_{mot}$ is the angular velocity of the electric motor mounted in the motor housing of the rear wheel.

In step 103 it is calculated at a time instant t the variation $\Delta I_{mot}$, with respect to a previous time instant (t−1), of the value of the motor current signal $I_{mot}$ for driving the electric device as an electric motor supplied by battery 6, that is $I_{mot}(t)=I_{mot}(t-1)+\Delta I_{mot}(t)$. For example, the time interval between t and (t−1) is less than 20 µs, corresponding to a calculation frequency of at least 50 Hz.

In the present description it is used the convention of considering $\Delta I_{mot}>0$ for indicating that the electric device operates as an electric motor and thus direction of the motor current is from the battery 6 to the electric motor, that is the battery supplies current to the electric motor, wherein the electric energy is converted into mechanical energy for the motion of the front wheel of the bicycle 1.

The variation $\Delta I_{mot}$ of the value of the motor current signal $\Delta I_{mot}$ is calculated as a function of difference $\Delta P$ between the human power $P_{um}$ and the friction power $P_{attr}$ and as a function of the value of the state of charge signal $S_{sdc}$.

For example, the variation $\Delta I_{mot}$ of the value of the motor current signal is calculated with the following formula (3):

$$\Delta I_{mot}=\beta(S_{sdc})*[\Delta P/(k_T*\omega_{rt})] \quad (3)$$

wherein:

$k_T$ is the electric constant of the electric motor, $$\Delta P=P_{um}-P_{attr}, \quad (4)$$

wherein:

$$P_{um}=\tau_{ped}*\omega_{ped}; \quad (5)$$

$$P_{attr}=R_{rt}*F_{attr}(v)*\omega_{rt}; \quad (6)$$

$\beta(S_{sdc})$ is a function of the state of charge signal $S_{sdc}$, that is it depends on the state of charge of the battery 6.

In particular, the function $\beta(S_{sdc})$ is directly proportional to the state of charge signal $S_{sdc}$. For example, the function $\beta(S_{sdc})$ has a substantially increasing trend from the value 0 to the value 1 and it takes the value 0 when the state of charge signal $S_{sdc}$ has a minimum threshold value $S_{sdc\_min}$ (greater than zero), while it takes the value 1 when the state of charge signal $S_{sdc}$ has a maximum threshold value $S_{sdc\_max}$ (greater than $S_{sdc\_min}$). The minimum threshold value $S_{sdc\_min}$ and the maximum threshold value $S_{sdc\_max}$ are pre-determined or can be modified by the cyclist; for example, $S_{sdc\_min}=0.1$ and $S_{sdc\_max}=0.6$.

Figure 5:
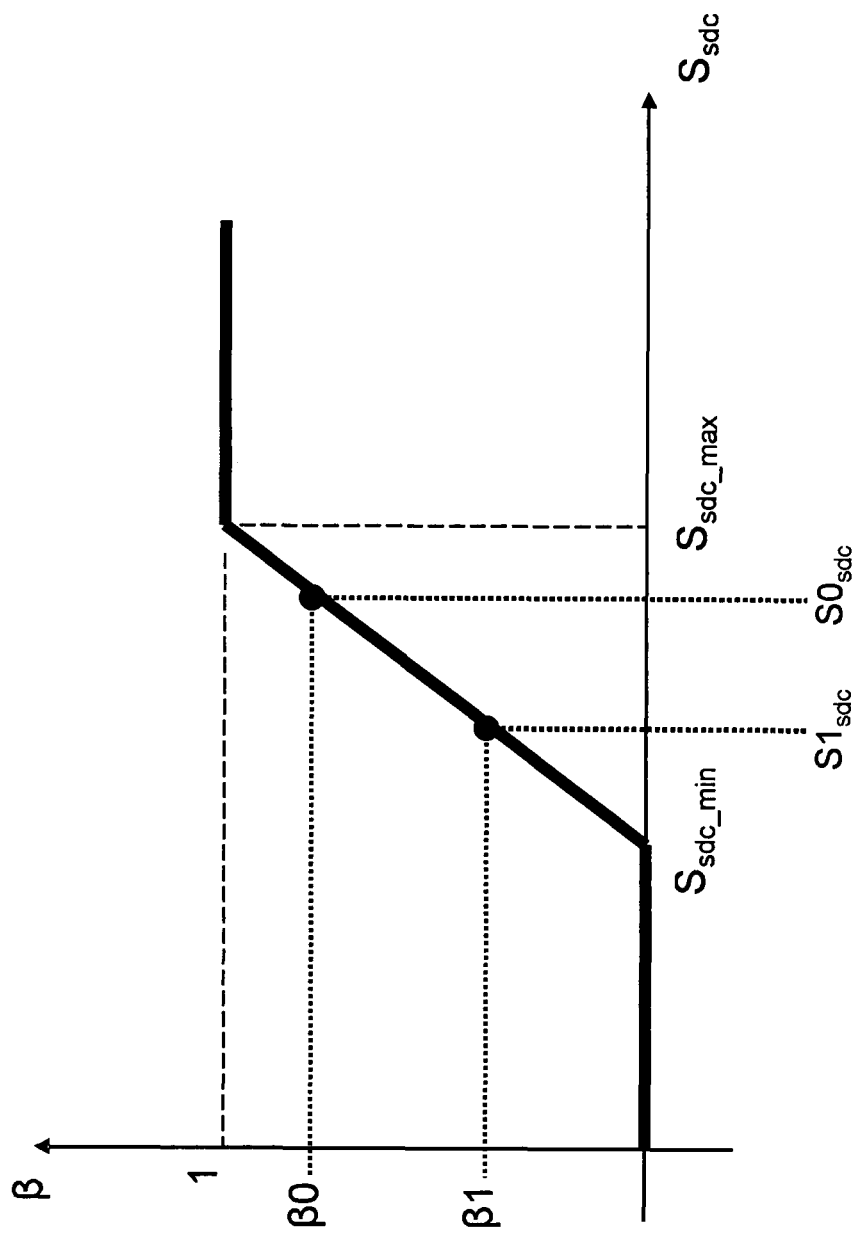
FIG. 5 schematically shows a possible trend of the function β as the state of charge of the battery changes, FIG. 6 schematically shows a possible trend of the charge current function, FIG. 7 schematically shows a first possible trend of power signals of the driving system according to the invention.

Preferably, the function $\beta(S_{sdc})$ has the trend shown in FIG. 5, wherein the trend is substantially linear increasing in the range comprised between $S_{sdc\_min}$ and $S_{sdc\_max}$.

In step 105 it is calculated the value of the motor current signal $I_{mot}$ for the operation of the electric device as an electric generator for charging battery 6. In the present description it will be used the convention of considering $I_{mot}<0$ for indicating that the electric device operates as an electric generator and thus the direction of the current $I_{mot}$ is from the electric generator to battery 6, that is the electric generator converts the mechanical power of the front wheel of the bicycle 1 into electric power and generates current towards the battery 6 which is recharged, thus in the battery 6 the electric power is convrted into chemical power stored into the battery 6.

The value of the motor current signal $I_{mot}$ in the step 105 is calculated as a function of the velocity v of the bicycle 1 and as a function of the value of the state of charge signal $S_{sdc}$.

For example, the value of motor current signal $I_{mot}$ is calculated by the following formula:

$$I_{mot}=[1-\beta(S_{sdc})]*I_{chg}(v) \quad (7)$$

wherein $\beta(S_{sdc})$ has been previously defined, v is the velocity of the bicycle 1 (calculated for example with the formula $v=\omega_{rt}*R_{rt}$) and $I_{chg}(v)$ is a charge current function depending on the velocity v of the bicycle 1.

Figure 6:
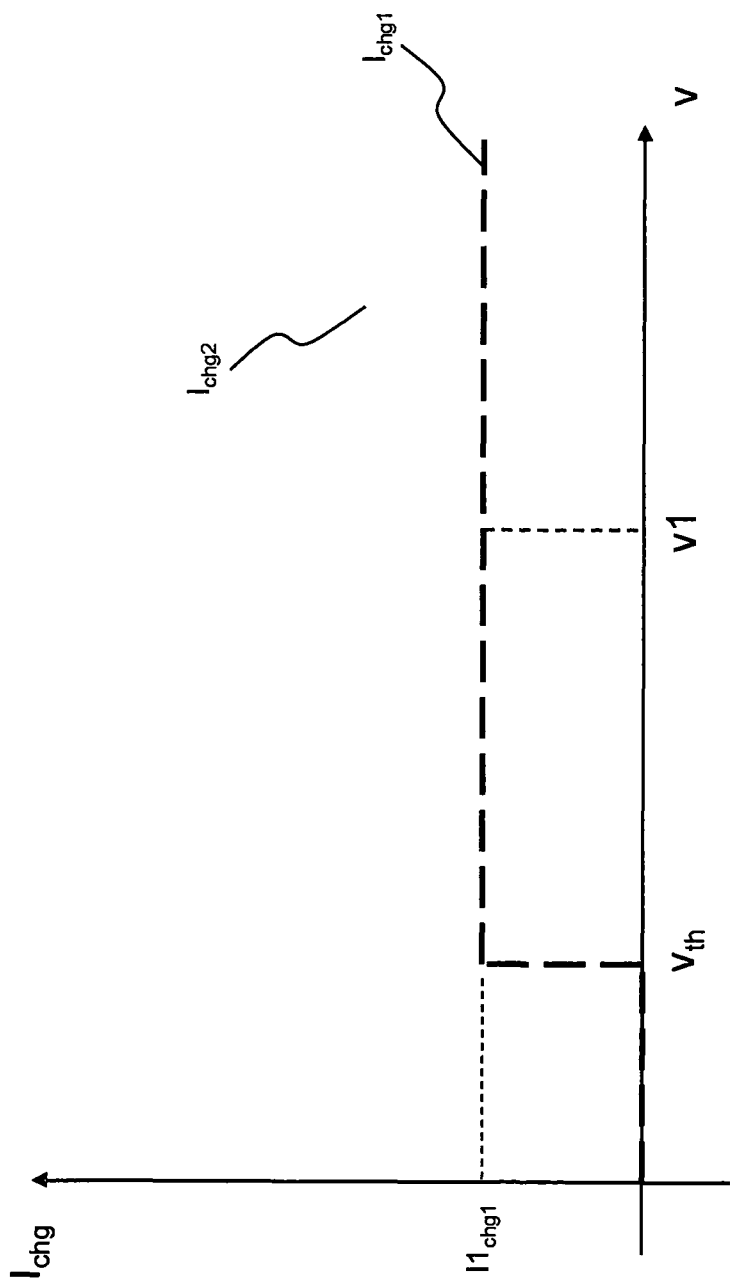

For example, the charge current function $I_{chg}(v)$ can have the trends $I_{chg1}$ (dashed line) or $I_{chg2}$ (solid line) shown in FIG. 6. In particular, the charge current function $I_{cgh1}$ has a substantially null value for values of the velocity of the bicycle 1 comprised between 0 and a velocity threshold value $v_{th}$ (for example equal to 6 Km/h) and has a value $I1_{chg1}$ substantially constant (for example equal to 3 Ampere) for values of the velocity of the bicycle 1 greater than the velocity threshold value $v_{th}$: in this way the current generated by the electric device operating as an electric generator is independent on the velocity v of the bicycle. The charge current function $I_{chg2}$ is directly proportional to the velocity v of the bicycle 1; for example, the charge current function $I_{chg2}$ has a substantially linear increasing trend starting from value 0 for a velocity equal to 0: in this way the power generated by the electric device operating as electric generator is substantially constant.

Referring to FIG. 4b, it is schematically shown a flow chart of a method 150 for driving the electric device of the electrically assisted bicycle 1 according to a second embodiment of the invention. It has to be observed that in FIG. 4b steps and symbols equal to the ones of FIG. 4a are indicated with the same reference numbers.

The method 150 comprises the steps 101, 102, 153, 154, 105.

In the step 101 it is performed the comparison between the human power $P_{um}$ and the friction power $P_{attr}$: in case wherein the human power is greater than or equal to the friction power, it is performed the step 102, otherwise it is performed the step 105.

In the step 102 it is evaluated the slope $\theta_{str}$ of the road (in other words the slope of the ground) wherein the bicycle 1 is running. When the slope of the road $\theta_{str}$ is greater than zero (that is the cyclist is running along an uphill road) or equal to zero (that is the cyclist is running along an flat road), it is performed step 153. In the case wherein the slope of the road $\theta_{str}$ is smaller than zero (that is the cyclist is running along a downhill road), it is performed the step 154.

The step 153 is similar to the step 103 of the method 100 according to the first embodiment, with the difference that in the step 153 the variation $\Delta I_{mot}'$ of the value of the motor current signal for driving the electric device as an electric motor supplied by battery 6 is calculated also as a function of a slope power $P_{pend}$ and as a function of the time variation $dP_{pend}/dt$ of the slope power. The term slope power means the power associated to the slope, that is the power that the force of gravity transmits to the vehicle, and is calculated with the following formula:

$$P_{pend}=m*g*sen(\theta_{str})*R_{rt}*\omega_{rt} \quad (8)$$

wherein m is the sum of the mass of the bicycle and of the cyclist average mass (for example, the cyclist average mass is estimated equal to 70 Kg), g is the gravitational acceleration (9.81 m/s$^2$) and $\theta_{str}$ is the slope of the road wherein the bicycle is running (that is the angle included between the road and the horizon).

Therefore the variation of the value of the motor current signal $\Delta I_{mot}'$ is calculated as a function of the difference $\Delta P'$ between the human power $P_{um}$, the friction power $P_{attr}$ and the slope power $P_{pend}$, as a function of the time variation $dP_{pend}/dt$ of the slope power and as a function of the value of the state of charge signal $S_{sdc}$.

For example, the variation of the value of the motor current signal $\Delta I_{mot}'$ is calculated with the following formula (9):

$$\Delta I_{mot}'=\beta(S_{sdc})*[\Delta P'/(k_T*\omega_{rt})+\alpha*(dP_{pend}/dt)] \quad (9)$$

wherein:
- the slope power $P_{pend}$ has been calculated with the formula (8),
- $k_T$ is the electric constant of the electric motor,
- $\alpha$ is a pre-determined constant, which depends on the value of the help which is given to the cyclist in the starting phase of the ascent,
- $\Delta P'=P_{um}-P_{attr}-P_{pend}$ wherein:
  - $P_{um}$ has been defined with the formula (1);
  - $P_{attr}$ has been defined with the formula (2);
  - $P_{pend}$ has been defined with the formula (8);
- $\beta(S_{sdc})$ is the function of the state of charge signal $S_{sdc}$ previously defined in the description of the method 100 according to the first embodiment of the invention.

In the step 154 it is calculated the value of the motor current signal $I_{mot}$ for the operation of the electric device as an electric generator for charging the battery 6, in the same way of step 105 of the method 100 according to the first embodiment of the invention.

The value of the motor current signal $I_{mot}$ in the step 154 is calculated as a function of the velocity v of the bicycle 1 and as a function of the value of the state of charge signal $S_{sdc}$. For simplicity, it is assumed that the motor current signal $I_{mot}$ value in the step 154 is calculated similarly to the step 105, that is with the formula (7).

Figure 7:
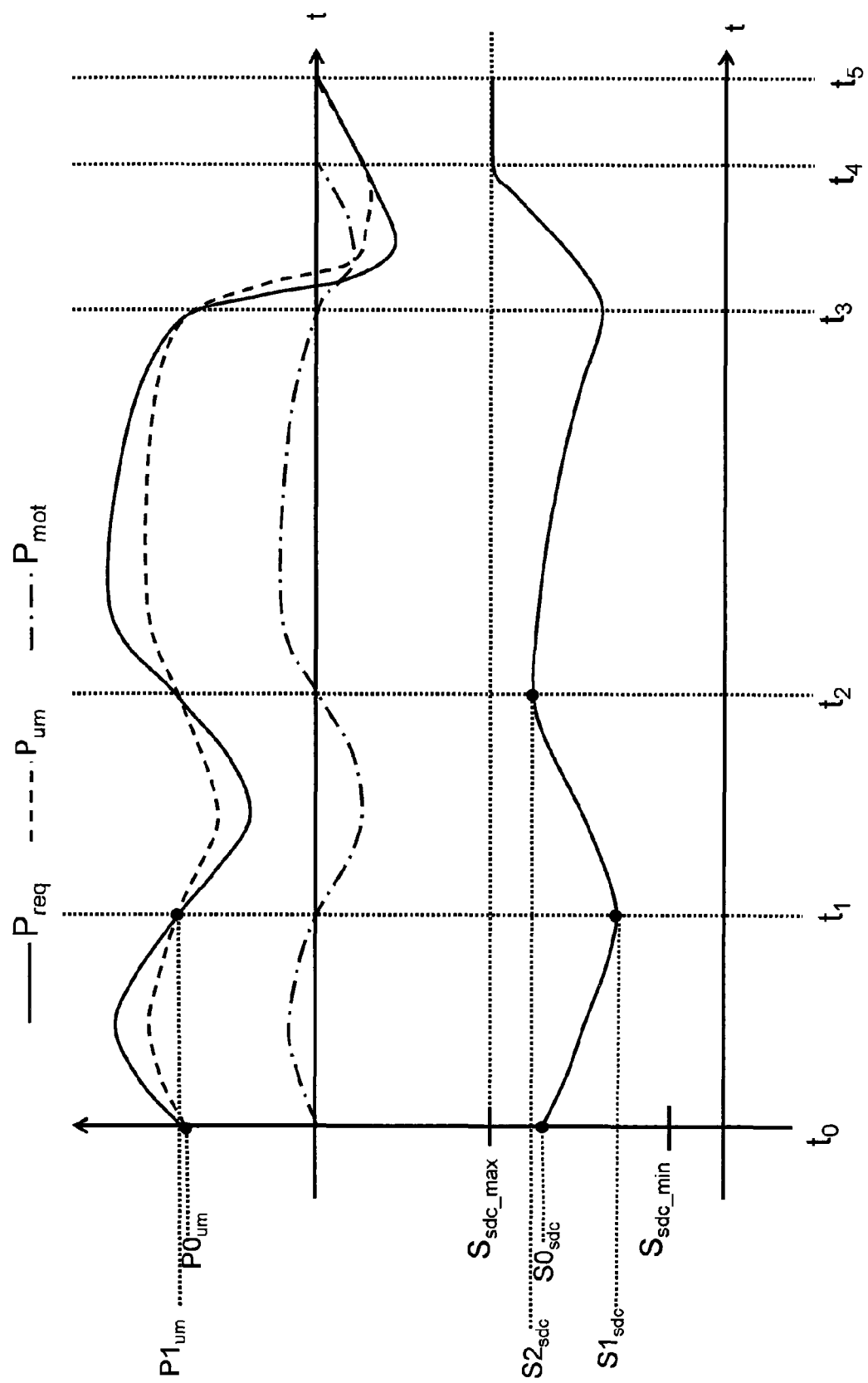

Referring to FIG. 7, it is shown a first possible trend of the power signals of the driving system 50. In particular, the upper part of FIG. 7 shows the trends of the required power signals $P_{req}$, of the human power signal $P_{um}$ and of the motor power signal $P_{mot}$, while the lower part of FIG. 7 shows the trend of the state of charge signal $S_{sdc}$. The term motor power $P_{mot}$ means the mechanical power generated by the electric device of the bicycle 1 when it operates as an electric motor (in this case it is assumed $P_{mot}>0$) and the electric power generated by the electric device of the bicycle 1 when it operates as an electric generator (in this case it is assumed $P_{mot}<0$). The term required power $P_{req}$ means the value of the mechanical power necessary to the cyclist for covering a certain part of the road by the bicycle 1 and it is defined as the sum of the human power $P_{um}$ with the motor power $P_{mot}$, that is $P_{req}=P_{um}+P_{mot}$. In other words, the bicycle 1 is operated both by the cyclist generating the human power $P_{um}$ and by the electric motor generating the motor power $P_{mot}$.

In the time interval comprised between the instants $t_0$ and $t_1$ the cyclist is perceiving a high fatigue sensation; for example, the cyclist has started while standing or is covering an uphill part of the road. In this case the electric device mounted in the motor housing 5 of he bicycle 1 operates as an electric motor and thus helps the cyclist during the run of the bicycle 1, by reducing the fatigue sensation perceived by the cyclist; therefore in this interval the electric energy supplied by battery 6 is used for operating the electric motor, which in turn converts the electric energy into mechanical energy used for rotating the electric motor, which generates the motor power $P_{mot}>0$ contributing—together with the human power $P_{um}$ generated by the cyclist—to the motion of the front wheel of the bicycle 1.

Therefore in the interval between $t_0$ and $t_1$ the human power $P_{um}'$ (not shown in the figures) without the electric device—defined as the power generated by the cyclist on the pedal arms when he is pedaling on a not electrically assisted bicycle (that is without the electric device), in the same road conditions of the cyclist which is pedaling on the bicycle 1—would be sharply greater than the human power $P_{um}$ with the electric device. It is possible to observe that the state of charge signal $S_{sdc}$ has a decreasing trend, that is the battery 6 is discharging because it is supplying electric power to the electric motor to help the cyclist who is perceiving a high fatigue sensation; moreover it is possible to observe that the value of the state of charge signal $S_{sdc}$ at the instant $t_1$ is greater than the minimum threshold value $S_{sdc\_min}$.

In the time interval comprised between the instants $t_1$ and $t_2$ the cyclist is perceiving a low fatigue sensation (for example, the cyclist is covering a flat part of the road). In this case, the value of the state of charge signal $S_{sdc}$ at instant $t_1$ is smaller than the maximum threshold value $S_{sdc\_max}$ and the electric device operates as an electric generator and thus generates a current $I_{cs}$ which charges the battery 6, slightly increasing the fatigue sensation of the man, who however does not perceive this increase because it occurs in an operation condition (time interval between $t_1$ and $t_2$) wherein the fatigue sensation perceived by the cyclist is low; therefore in this time interval a part of power $P_{um}$ supplied by the human by means of the pressure on the pedal arms is converted into mechanical power for operating the electric device as an electric generator, which in turn performs a conversion of a part of power $P_{um}$ supplied by the human into electric power used for charging battery 6.

Therefore in the time interval between $t_1$ and $t_2$ the human power $P_{um}'$ (not shown in the drawings) without the electric device would be slightly smaller than the human power $P_{um}$ with the electric device. It is possible to observe that the state of charge signal $S_{sdc}$ has an increasing trend, that is the battery 6 is charging because a part of the human power $P_{um}$ generated by the cyclist is used for charging the battery 6, by means of the conversion of the mechanical power of the electric generator into electric power and then into chemical power stored into the battery 6; moreover, it is possible to observe that the value of the state of charge signal $S_{sdc}$ at instant $t_2$ is smaller than the maximum threshold value $S_{sdc\_max}$.

In the time interval comprised between instants $t_2$ and $t_3$ the electric device of the bicycle 1 operates as an electric motor helping the cyclist, analogously to the time interval between $t_0$ and $t_1$.

In the time interval comprised between instants $t_3$ and $t_4$ the electric device of the bicycle 1 operates as an electric generator generating current $I_{cs}$ which charges the battery 6, analogously to the time interval between $t_1$ and $t_2$. It is possible to observe that the state of charge signal $S_{sdc}$ at instant $t_4$ has reached the maximum threshold value $S_{sdc\_max}$; that is the battery 6 has been charged at the maximum threshold value.

In the time interval comprised between instants $t_4$ and $t_5$ the cyclist is perceiving a low fatigue sensation (for example, the cyclist is covering a flat part of the road). In this case, since the value of the state of charge signal $S_{sdc}$ at instant $t_4$ is equal to the maximum threshold value $S_{sdc\_max}$, the electric generator of the bicycle 1 does not further generate the current $I_{cs}$ and thus it does not further recharge battery 6, which is already charged at the maximum threshold value.

It is possible to observe that the value of the state of charge signal $S_{sdc}$ in the time interval comprised between instants $t_0$ and $t_5$ is always comprised between the minimum threshold value $S_{sdc\_min}$ and the maximum threshold value $S_{sdc\_max}$ in this way the range of the bicycle 1 is increased and, advantageously, it is no more necessary to recharge battery 6 by connecting it to an electric source external to bicycle 1 (for example, it is not necessary to use an external battery charger connecting the electric network to the battery 6).

Figure 8:
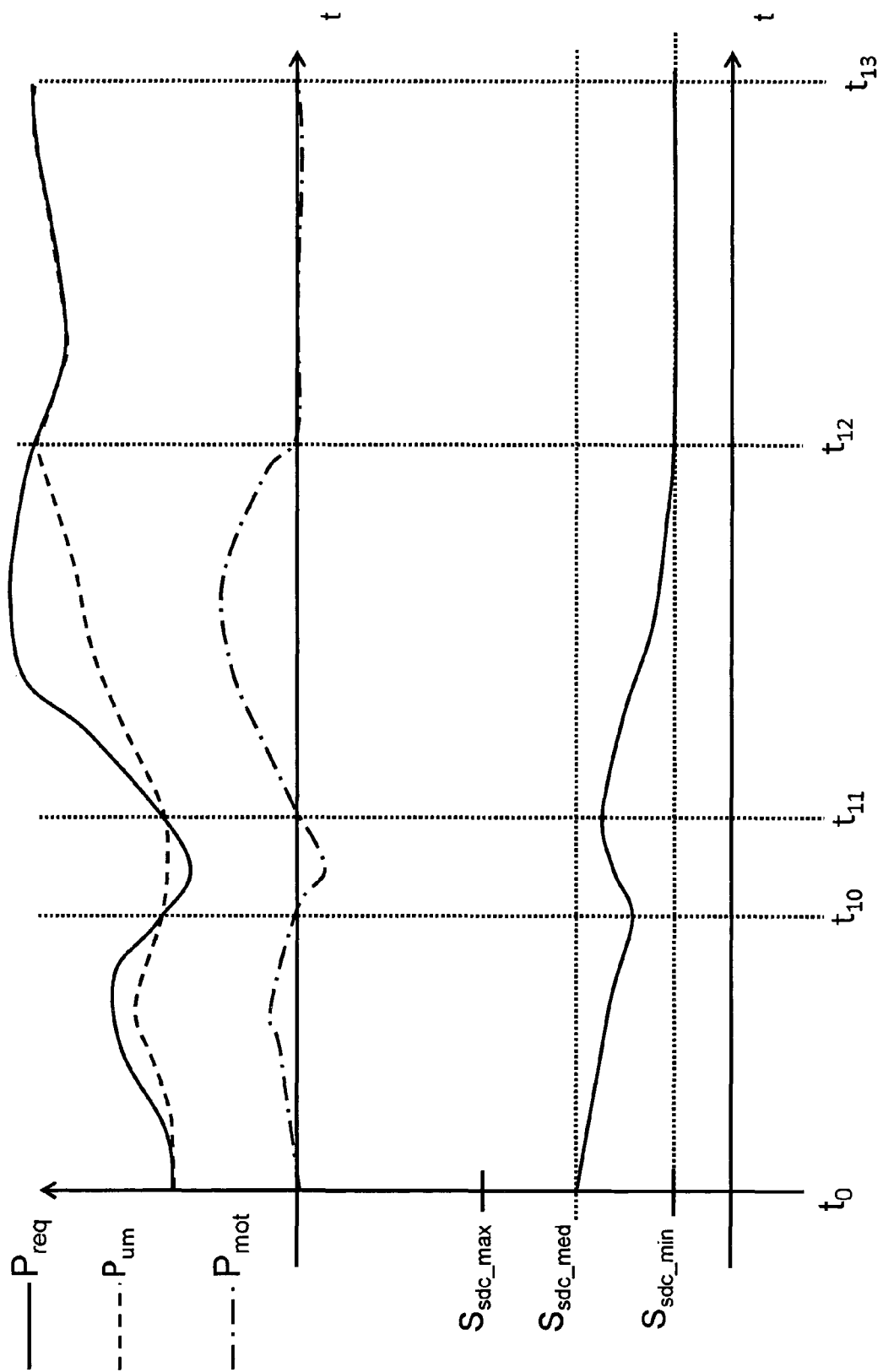
FIG. 8 schematically shows a second possible trend of the power signals of the driving system according to the invention.

Referring to FIG. 8, it is shown a second possible trend of the power signals of the driving system 50. Similarly to FIG. 7, also the upper part of FIG. 8 shows the trends of the required power signals $P_{req}$, of the human power signal $P_{um}$ and of the motor power signal $P_{mot}$, while the lower part shows the trend of the state of charge signal $S_{sdc}$.

In the time interval comprised between instants $t_0$ and $t_{10}$ the cyclist is perceiving a high fatigue sensation. The electric device mounted in the motor housing 5 of the bicycle 1 operates as an electric motor and thus helps the cyclist during the run of the bicycle 1, by reducing the fatigue sensation perceived by the cyclist, analogously to the interval between $t_0$ and $t_1$ of FIG. 7.

In the time interval comprised between instants $t_{10}$ and $t_{11}$ the cyclist is perceiving a low fatigue sensation. The electric device operates as an electric generator generating current $I_{cs}$ which charges the battery 6, analogously to the interval between $t_1$ and $t_2$ of FIG. 7.

In the time interval comprised between the instants $t_{11}$ and $t_{12}$ the electric device of the bicycle 1 operates as an electric motor helping the cyclist during the run of the bicycle 1, analogously to the interval between $t_0$ and $t_{10}$. It is possible to observe that the state of charge signal $S_{sdc}$ at the instant $t_{12}$ has reached the minimum threshold value $S_{sdc\_min}$, that is the battery 6 is discharged at the minimum threshold value.

In the time interval comprised between the instants $t_{12}$ and $t_{13}$ the cyclist is perceiving a high fatigue sensation. In this case, since the value of the state of charge signal $S_{sdc}$ at the instant $t_{12}$ is equal to the minimum threshold value $S_{sdc\_min}$, the electric device of the bicycle 1 no more operates as an electric generator, that is it does not help anymore the cyclist during the run of the bicycle 1, even if he is perceiving a high fatigue sensation, preventing in this was the battery 6 from excessively discharging, increasing the range of the bicycle 1 and, advantageously, preventing the battery 6 from being recharged by connecting it to an electric source external to the bicycle 1.

It will be described hereinafter the operation of the electronic system 50, by reference to FIGS. 2, 3, 4a, 5, 6 and 7.

It is assumed that the processor 20 is capable of reading out (for example from a memory connected to it) the value of the radius $R_{rt}$ of the front wheel of the bicycle 1, the value of the friction $F_{attr}(v)$ of the bicycle 1 as the velocity v of the bicycle 1 changes, the value of the electric constant of the electric motor $k_T$, the minimum threshold value $S_{sdc\_min}$ and the maximum threshold value $S_{sdc\_max}$. For example, said values are defined by means of a configuration phase before the instant $t_0$ wherein the operation of the bicycle 1 starts.

For the sake of simplicity it is further assumed that $\omega_{rt}=\omega 0_{mot}$.

The time instants $t_0$, $t_1$, $t_2$, $t_3$, $t_4$, $t_5$ represent the time instants when the processor 20 runs the method 100 and calculates the value of the motor current signal $I_{mot}$ and of the charge/discharge current signal $I_{cs}$: the distance between said time instants does not necessarily correspond to the calculation period (for example, 20 µs) used by the processor 20, that is between two subsequent instants (for example, between $t_0$ and $t_1$) the processor 20 can execute one or more times the method 100, but for simplicity these executions are disregarded.

At instant $t_0$ the cyclist of the bicycle 1 starts to pedal while standing and thus he perceives a rather high fatigue sensation.

The measurement module 8 measures a first value $\omega 0_{ped}$ of the angular velocity of the pedal arms of the bicycle 1 and measures a first value $\tau 0_{ped}$ of the torque generated by the cyclist on the pedal arms of the bicycle 1.

The processor 20 executes the method 100 by means of a computer program running on the processor 20 and by means of software code portions. For example, the programming language used for the software code is "ANSI C" language.

In particular, the processor 20 receives the pedal arms velocity signal $S_{\omega\_ped}$ having the first value of the pedal arms angular velocity $\omega 0_{ped}$, receives the pedal arms torque signal $S_{\tau\_ped}$ having the first value of the generated torque $\tau 0_{ped}$ and calculates a first value $P0_{um}$ of the human power by means of the formula $P0_{um}=\tau 0_{ped}*\omega 0_{ped}$.

The motor sensor measures a first value $\omega 0_{mot}$ of the angular velocity of the electric motor; the processor 20 receives the motor velocity signal $S_{\omega\_mot}$ having the first value of the electric motor angular velocity $\omega 0_{mot}$ and obtains therefrom the velocity v0 of the bicycle 1, for example with the formula $v0=\omega_{rt}*R_{rt}=\omega 0_{mot}*R_{rt}$.

The processor 20 receives the motor velocity signal $S_{\omega\_mot}$ having the first value $\omega 0_{mot}$ of the electric motor angular velocity, reads out the value of the radius $R_{rt}$ and the value of the friction $F_{attr}(v0)$ as a function of the bicycle velocity v0 (that is $F_{attr}(v0)=F0_{attr}$) and calculates a first value $P0_{attr}$ of the estimation of the friction power by means of the formula $P0_{attr}=R_{rt}*F0_{attr}*\omega_{rt}=R_{rt}*F0_{attr}*\omega 0_{mot}$.

In step 101 the processor 20 performs the comparison between the first human power value $P0_{um}$ and the first friction power estimation value $P0_{attr}$ and detects that $P0_{um}>P0_{attr}$.

The state of charge detecting circuit 23 receives the battery signal $S_{bat}$ and, as a function of it, calculates a first value $S0_{sdc}$ of the state of charge signal $S_{sdc}$ which indicates the state of charge of the battery 6.

In step 103 the processor 20 detects that the first value of the state of charge signal $S0_{sdc}$ is greater than the minimum threshold value $S_{sdc\_min}$ and generates the selection signal $S_{sel}$ having the first low logic value indicating the first operation mode as electric motor.

Moreover, in step 103 the processor 20 calculates (see FIG. 5) a first value $\beta 0$ of the function $\beta$ corresponding to the first value of the state of charge signal $S0_{sdc}$, that is $\beta 0=\beta(S0_{sdc})$.

Moreover, in step 103 the processor 20 calculates the difference $\Delta P0$ between the human power $P0_{um}$ and the friction power $P0_{attr}$, that is:

$$\Delta P0=P0_{um}-P0_{attr}=\tau 0_{ped}*\omega 0_{ped}-R_{rt}*F0_{attr}*\omega 0_{mot}$$

Afterwards, in step 103 the processor 20 calculates the variation $\Delta I0_{mot}$ of the motor current signal $I_{mot}$ according to formula (3), that is:

$$\Delta I0_{mot}=\beta 0*[\Delta P0/(k_T*\omega_{rt})]=\beta 0*[\Delta P0/(k_r*\omega 0_{mot})] \quad (3')$$

Finally, in step 103 the processor 20 generates the processed signal $S_{elab}$ carrying the value $\Delta I0_{mot}$.

The current management module 22 receives the selection signal $S_{sel}$ having the first low logic value which indicates the first operation mode as an electric motor, receives the processed signal $S_{elab}$ carrying the value $\Delta I0_{mot}$, turns on the electric device in the motor housing 5 in the operation mode as an electric motor, activates the circuits necessary for transmitting the motor current $I_{mot}$ equal to the charge/discharge current $I_{cs}$ in the direction from battery 6 towards the electric motor in the motor housing 5, thus generates the motor current $I_{mot}$ equal to the value $\Delta I0_{mot}$, that is $I_{mot}=I0_{mot}=\Delta I0_{mot}$.

The electric motor in the motor housing 5 receives the value $I0_{mot}$ of the motor current $I_{mot}$, causing a rotation of the electric motor with an angular velocity equal to a value $\omega 0_{mot}'$ (different from $\omega 0_{mot}$).

The electric motor is mechanically connected to the front wheel of the bicycle 1, for example is mounted in the hub of the front wheel; in this case, the rotation of the electric motor contributes to the rotation of the front wheel, in addition to the human power $P0_{um}$ generated by the cyclist during the pedaling at instant $t_0$, thus reducing the fatigue perceived by the cyclist.

In the instants between $t_0$ and $t_1$ (excluded), the processor 20 continues to detect that the value of the human power $P_{um}$ is greater than the value of the estimation of the friction power $P_{attr}$. Consequently, the operation of the electronic system 50 in the instants comprised between $t_0$ and $t_1$ (excluded) is analogous to the one at instant $t_0$ and theus the electric motor helps the cyclist during the pedaling, while the battery 6 discharges from the first value of the state of charge signal $S0_{sdc}$ to a second value of the state of charge signal $S1_{sdc}$ (see the diagram in the lower part of FIG. 7), because it is consumed the electric energy of the battery 6 for supplying the operation of the electric motor.

At the instant $t_1$ the cyclist of bicycle 1 is pedaling on a substantially flat road and perceives a low fatigue sensation.

The measurement module 8 measures a second value $\omega 1_{ped}$ of the pedal arms angular velocity of the bicycle 1 and measures a second value $\tau 1_{ped}$ of the torque generated by the cyclist on the pedal arms of the bicycle 1.

Again, the processor 20 executes the method 100 by means of the computer program running on the processor 20.

In particular, the processor 20 receives the pedal arms signal $S_{\omega\_ped}$ having the second value of the pedal arms angular velocity $\omega 1_{ped}$, receives the pedal arms torque signal $S_{\tau\_ped}$ having the second value of the generated torque $\tau 1_{ped}$ and calculates a second value $P1_{um}$ of the human power by means of the formula $P1_{um}=\tau 1_{ped}*\omega 1_{ped}$.

The motor sensor measures a second value $\omega 1_{mot}$ of the angular velocity of the electric motor; the processor 20 receives the motor velocity signal $S_{\omega\_mot}$ having the second value of the electric motor angular velocity $\omega 1_{mot}$ and obtains therefrom the velocity v1 of the bicycle 1, for example with the formula $v1=\omega_{rt}*R_{rt}=\omega 1_{mot}*R_{rt}$.

The processor 20 receives the motor velocity signal $S_{\omega\_mot}$ having the second value of the electric motor angular velocity $\omega 1_{mot}$, reads out the radius $R_{rt}$ and the value of the friction $F_{attr}(v1)$ as a function of the velocity v1 of the bicycle (that is $F_{attr}(v1)=F1_{attr}$) and calculates a second value $P1_{attr}$ of the estimation of the friction power by means of the formula $P1_{attr}=R_{rt}*F1_{attr}*\omega_{rt}=R_{rt}*F1_{attr}*\omega 1_{mot}$.

In step 101 the processor 20 performs the comparison between the second value of the human power $P1_{um}$ and the second value of the estimation of the friction power $P1_{attr}$ and detects that $P1_{um}<P1_{attr}$.

The state of charge detecting circuit 23 receives the battery signal $S_{bat}$ and, as a function of it, calculates a second value $S1_{sdc}$ of the state of charge signal $S_{sdc}$ indicating the state of charge of the battery 6.

In step 105 the processor 20 detects that the second value of the state of charge signal $S1_{sdc}$ is smaller than the maximum threshold value $S_{sdc\_max}$ and generates the selection signal $S_{sel}$ having the second high logic value indicating the second operation mode as an electric generator.

Moreover, in step 105 the processor 20 calculates (see FIG. 5) a second value $\beta 1$ of the function $\beta$ corresponding to the second value of the state of charge signal $S1_{sdc}$, that is $\beta 1=\beta(S1_{sdc})$; moreover, the processor 20 calculates a value $I1_{chg1}$ (see FIG. 6) of the charge current function $I_{chg1}$ (v) corresponding to the second value of the velocity v2, that is $I_{chg1}$ (v1)=I1$_{chg1}$.

Afterwards, the processor 20 calculates in step 105 the value of the charge/discharge signal $I_{cs}$ according to formula (7), that is:

$$I1_{mot}[1-\beta 1]*I1_{chg1}$$

Therefore the processor 20 generates the processed signal $S_{elab}$ carrying the value $I1_{mot}$.

The current management module 22 receives the selection signal $S_{sel}$ having the second high logic value indicating the second operation mode as electric generator, switches the electric device in the motor housing 5 from the operation as electric motor to the operation as electric generator, receives the processed signal $S_{elab}$ carrying the value $I1_{mot}$, activates the circuits necessary to transmit the charge/discharge current $I_{cs}$ equal to the motor current $I_{mot}$ in the direction from the electric motor in the motor housing 5 to the battery 6, thus generates the charge/discharge current $I_{cs}$ equal to the value $I1_{mot}$, that is $I_{cs}=I1_{mot}$.

The battery 6 receives the value $I1_{mot}$ of the charge/discharge current $I_{cs}$ and the battery 6 starts charging.

Therefore the cyclist generates during the run of the bicycle 1 at instant $t_1$ a human power $P1_{um}$ and a part of it is used for moving the electric generator in the motor housing 5, which generates the charge/discharge current $I_{cs}$, which starts charging the battery 6.

In the instants comprised between $t_1$ and $t_2$ (excluded) the processor 20 continues to detect that the value of human power $P_{um}$ is smaller than the value of the estimation of the friction power $P_{attr}$. Consequently, the operation of the electronic system 50 at instants comprised between $t_1$ and $t_2$ (excluded) is analogous to the operation at instant $t_1$ and thus the electric generator recharges battery 6, which recharges from the second value of the state of charge signal $S1_{sdc}$ to a third value of the state of charge signal $S2_{sdc}$ (see the diagram in the lower part of FIG. 7), because it is used a part of the power generated by the man on the pedal arms for recharging battery 6.

In the time interval comprised between the instants $t_2$ and $t_3$ (excluded) the electric device in the motor housing 5 operates as an electric motor which helps the cyclist, analogously to the time interval between $t_0$ and $t_1$; therefore the considerations made with reference to the operation in the time interval between $t_0$ and $t_1$ can also be applied analogously to the time interval between $t_2$ and $t_3$.

In the time interval comprised between instants $t_3$ and $t_3$ (excluded) the electric device in the motor housing 5 operates as an electric generator recharging the battery 6, analogously to the time interval between $t_1$ and $t_2$; therefore the considerations made with reference to the operation in the time interval between $t_1$ abd $t_2$ can be applied analogously to the time interval between $t_3$ and $t_4$. It has to be observed that at the instant $t_4$ the state of charge signal $S_{sdc}$ has reached the maximum threshold value $S_{sdc\_max}$, that is the battery 6 has been charged at the maximum threshold value.

At instant $t_4$ the cyclist is perceiving a low fatigue sensation. The state of charge detecting circuit 23 receives the battery signal $S_{bat}$ and, as a function of it, calculates a fourth value $S4_{sdc}$ of the state of charge signal $S_{sdc}$ indicating the state of charge of the battery 6. The processor 20 detects that the fourth value of the state of charge signal $S4_{sdc}$ is equal to the maximum threshold value $S_{sdc\_max}$ and calculates (see FIG. 5) the value of function $\beta$ corresponding to the maximum threshold value $S_{sdc\_max}$, that is $\beta 4=\beta(S_{sdc\_max})=1$; moreover, the processor 20 calculates the value $I1_{chg1}$ (see FIG. 6) of the charge current function $I_{chg1}$(v) corresponding to a fourth value of velocity v4, that is $I_{chg1}$ (v4)=I4$_{chg1}$.

Afterwards, the processor 20 calculates the value of the charge/discharge current signal $I_{cs}$ according to the formula (7), that is:

$$I4_{mot}=[1-\beta 4]*I4_{chg1}=[1-1]*I4_{chg1}=0$$

Therefore also the value of the charge/discharge current $I_{cs}$ is equal to 0, that is the battery 6 is not further recharged.

At the instants comprised between $t_4$ and $t_5$ the processor 20 continues to detect that the fourth value of the state of charge signal $S4_{sdc}$ is equal to the maximum threshold value $S_{sdc\_max}$ and the operation of the electronic system 50 at the instants comprised between $t_4$ and $t_5$ is analogous to the one at instant $t_4$, that is the battery 6 is not further recharged, because it is already charged to its maximum value.

The operation of processor 20 executing at the instants comprised between $t_0$ and $t_1$ the steps 101, 102, 153 of the method 150 shown in FIG. 4b is similar to the one of the steps 101, 103 of the method 100 previously shown, with the following differences.

After the step 101, it is performed the step 102 wherein the inclination sensor 9 measures a first value $\theta 0_{str}$ of the road slope along wherein the bicycle 1 is running; moreover, the processor 20 receives the slope signal $S_{\theta\_str}$ having a first slope value $\theta 0_{str}$, detects $\theta 0_{str}>0$ (that is the cyclist is running along an uphill road) and executes step 153.

The step 153 is analogous to the step 103 of the method 100, with the following differences. The processor 20 calculates the first value $P0_{pend}$ of the slope power according to formula (8), that is:

$$P0_{pend}=m*g*sen(\theta 0_{str})*R_{rt}*\omega_{rt} \quad (8')$$

The processor 20 calculates the difference $\Delta P0'$ between the human power $P0_{um}$, the friction power $P0_{attr}$ and the slope power $P0_{pend}$, that is:

$$\Delta P0'=P0_{um}-P0_{attr}-P0_{pend}=\tau 0_{ped}*\omega 0_{ped}-\\R_{rt}*F0_{attr}*\omega 0_{mot}-m*g*sen(\theta 0_{str})*R_{rt}*\omega_{rt}$$

Processor 20 calculates the variation $\Delta P0'$ of the value of motor current signal $I_{mot}$ according to formula (9), that is:

$$\Delta I0_{mot}'=\beta 0*[\Delta P0'/(k_T*\omega_{rt})+\alpha*(dP0_{pend}/dt)]=\beta 0*\\ [\Delta P0'/(k_T*\omega 0_{mot})=\alpha*(dP_{pend}/dt)] \quad (9')$$

Therefore the processor 20 generates the processed signal $S_{elab}$ carrying the value $\Delta I0_{mot}'$ and thus the current management module 22 generates the motor current $I_{mot}$ equal to the value $\Delta I0_{mot}'$.

It is an object of the present invention also a method for driving an electric device of a bicycle assisted electrically by means of a rechargeable battery. The method comprises the step a) of calculating a human power as a function of a torque of the bicycle pedal arms and of an angular velocity of the bicycle pedal arms, comprises the step b) of estimating a friction power of the bicycle as a function of an angular velocity of the electric motor and as a function of a bicycle speed, comprises the step c) of comparing the calculated human power with respect to the estimated bicycle friction power and checking the state of charge of the battery. In case of detecting that the calculated human power is greater than or equal to the estimated bicycle friction power and in case of detecting that the battery state of charge is greater than or equal to a first threshold, the method comprises the step d) of generating a driving current value for driving the electric device operating as an electric motor supplied from the battery. In case detecting that the calculated human power is smaller than the estimated bicycle friction power, the method comprises the step e) of generating another driving current value for charging the battery from the electric device operating as an electric generator.

Advantageously, the step d) further comprises, after the detection that the calculated human power is greater than or equal to the estimated bicycle friction power, the step of measuring the inclination of the road wherein the bicycle is running. In case the estimated inclination is greater than or equal to zero, the method comprises the step d2.1) of checking the state of charge of the battery and performing the step d). In case the estimated inclination is smaller than zero, the method comprises the step d2.2) of generating another driving current value for charging the battery from the electric device operating as an electric generator.

Advantageously, the steps e) or d2.2) comprise the generation of said other driving current value for charging the battery, in case of detecting that the battery state of charge is lower than a second threshold greater than the first threshold.

Advantageously, in step d) the generation of said driving current value is directly proportional to the value of the state of charge of the battery over an interval comprised between the first and the second threshold.

The steps of the method according to the invention can be performed by means of a computer program comprising software code and executed on the processor 20.

The invention claimed is:

1. Electronic system (50) to drive an electric device of a bicycle (1) assisted electrically by means of a rechargeable battery (6), said electric device being configured for operating as an electric motor supplied from the battery or as an electric generator for charging the battery,
the system comprising:
  a measurement module (8) configured for measuring the angular velocity ($S_{\omega\_ped}$) of the bicycle pedal arms and the torque ($S_{\tau\_ped}$) of the bicycle pedal arms;
  a sensor configured for measuring the angular velocity ($S_{\omega\_mot}$) of the electric motor;
  a circuit (23) configured for detecting a state of charge of the battery;
  a processor (20) configured for:
  calculating a bicycle speed as a function of the angular velocity of the electric motor;
  calculating (101) a human power ($P_{um}$) as a function of the measured torque of the bicycle pedal arms and of the measured angular velocity of the bicycle pedal arms;
  estimating (101) a friction power ($P_{attr}$) of the bicycle representing frictions caused by the cyclist and by the bicycle when the cyclist is pedaling as a function of the angular velocity of the electric motor and as a function of the bicycle speed, the friction power ($P_{attr}$) being calculated with the following formula:

$P_{attr} = v * F_{attr}(v)$ wherein:

v is the velocity of the bicycle
  $F_{attr}(v)$ is a coasting down function of the bicycle indicating the value of the friction of the bicycle as a function of the velocity v;
  comparing (101) the calculated human power with respect to the estimated bicycle friction power and checking the state of charge of the battery;
  in case of detecting that the calculated human power is greater than or equal to the estimated bicycle friction power and in case of detecting that the battery state of charge is greater than or equal to a first threshold ($S_{sdc\_min}$), operating the electric device as an electric motor and generating (103) a driving current value ($\Delta I_{mot}$) for driving the electric device operating as an electric motor supplied from the battery, the driving current value ($\Delta I_{mot}$) being calculated as a function of the difference between the human power ($P_{um}$) and the friction power ($P_{attr}$) and as a function of the state of charge of the battery;
  in case of detecting that the calculated human power is smaller than the estimated bicycle friction power, operating the electric device as an electric generator, and converting at least part of the human power into electric power by means of the electric device operating as an electric generator, and generating (105) from said electric power converted from the at least part of the human power another driving current value ($I_{chg}$) for charging the battery from the electric device operating as electric generator.

2. Electronic system according to claim 1, further comprising a sensor (9) configured for measuring the inclination of the road wherein the bicycle is running, wherein, in case of detecting that the calculated human power is greater than or equal to the estimated bicycle friction power, the processor (20) is further configured for:
  in case the estimated inclination is greater than or equal to zero, generating (153) said driving current value for driving the electric device operating as an electric motor;
  in case the estimated inclination is smaller than zero, generating (154) another driving current value for charging the battery from the electric device operating as an electric generator.

3. Electronic system according to claim 1, wherein the generation of said driving current value is directly proportional (β) to the value of the state of charge of the battery over an interval comprised between the first threshold ($S_{sdc\_min}$) and a second threshold ($S_{sdc\_max}$) greater than the first threshold.

4. Electronic system according to claim 3, wherein the processor is further configured for generating said other driving current value for charging the battery, in case of detecting that the battery state of charge is smaller than the second threshold ($S_{sdc\_max}$).

5. Electronic system according to claim 4, wherein the generation of said other driving current value is directly proportional ($I_{chg2}$) to the bicycle speed or is substantially constant ($I_{chg1}$) over the values of the bicycle speed greater than a speed threshold ($v_{th}$).

6. Electrically assisted bicycle comprising:
  a rechargeable battery (6);
  an electric device configured for operating as an electric motor supplied from the battery or as an electric generator for charging the battery;
  an electronic system (50) according to claim 1.

7. Method (100) for driving an electric device of a bicycle (1) assisted electrically by means of a rechargeable battery (6), the method comprising the steps of:
  a) calculating (101) a human power ($P_{um}$) as a function of a torque ($S_{\tau\_ped}$) of the bicycle pedal arms and of an angular velocity ($S_{\omega\_ped}$) of the bicycle pedal arms;
  b) estimating (101) a friction power ($P_{attr}$) of the bicycle representing frictions caused by the cyclist and by the bicycle when the cyclist is pedaling as a function of an angular velocity ($S_{\omega\_mot}$) of the electric motor and as a function of a bicycle speed, the friction power ($P_{attr}$) being calculated with the following formula:

$P_{attr} = v * F_{attr}(v)$ wherein:

v is the velocity of the bicycle $F_{attr}(v)$ is a coasting down function of the bicycle indicating the value of the friction of the bicycle as a function of the velocity v;

c) comparing (101) the calculated human power with respect to the estimated bicycle friction power and checking the state of charge of the battery;

d) in case of detecting that the calculated human power is greater or equal than the estimated bicycle friction power and in case of detecting that the battery state of charge is greater than or equal to a first threshold ($S_{sdc\_min}$), operating the electric device as an electric motor and generating (103) a driving current value ($\Delta I_{mot}$) for driving the electric device operating as an electric motor supplied from the battery, the driving current value ($\Delta I_{mot}$) being calculated as a function of the difference between the human power ($P_{um}$) and the friction power ($P_{attr}$) and as a function of the state of charge of the battery;

e) in case of detecting that the calculated human power is smaller than the estimated bicycle friction power, operating the electric device as an electric generator and converting at least part of the human power into electric power by means of the electric device operating as an electric generator, and generating (105) from said electric power converted from the at least part of the human power another driving current value ($I_{chg}$) for charging the battery from the electric device operating as electric generator.

8. Method (150) according to claim 7, wherein step d) further comprises, after the detection that the calculated human power is greater than or equal to the estimated bicycle friction power, the steps of:

d1) measuring (102) the inclination of the road wherein the bicycle is running;

d2.1) in case the estimated inclination is greater than or equal to zero, checking the state of charge of the battery and performing the step d);

d2.2) in case the estimated inclination is smaller than zero, generating (154) another driving current value for charging the battery from the electric device operating as an electric generator.

9. Method according to claim 8, wherein steps e) or d2.2) comprise the generation of said other driving current value for charging the battery, in case of detecting that the battery state of charge is smaller than a second threshold ($S_{sdc\_max}$) greater than the first threshold ($S_{sdc\_min}$), and wherein in step d) the generation of said driving current value is directly proportional ($\beta$) to the value of the state of charge of the battery over an interval comprised between the first threshold ($S_{sdc\_min}$) and the second threshold ($S_{sdc\_max}$).

10. Computer program comprising software code adapted to perform all the steps of the method according to claim 7, when said program is run on a computer.

* * * * *